Figure 2:
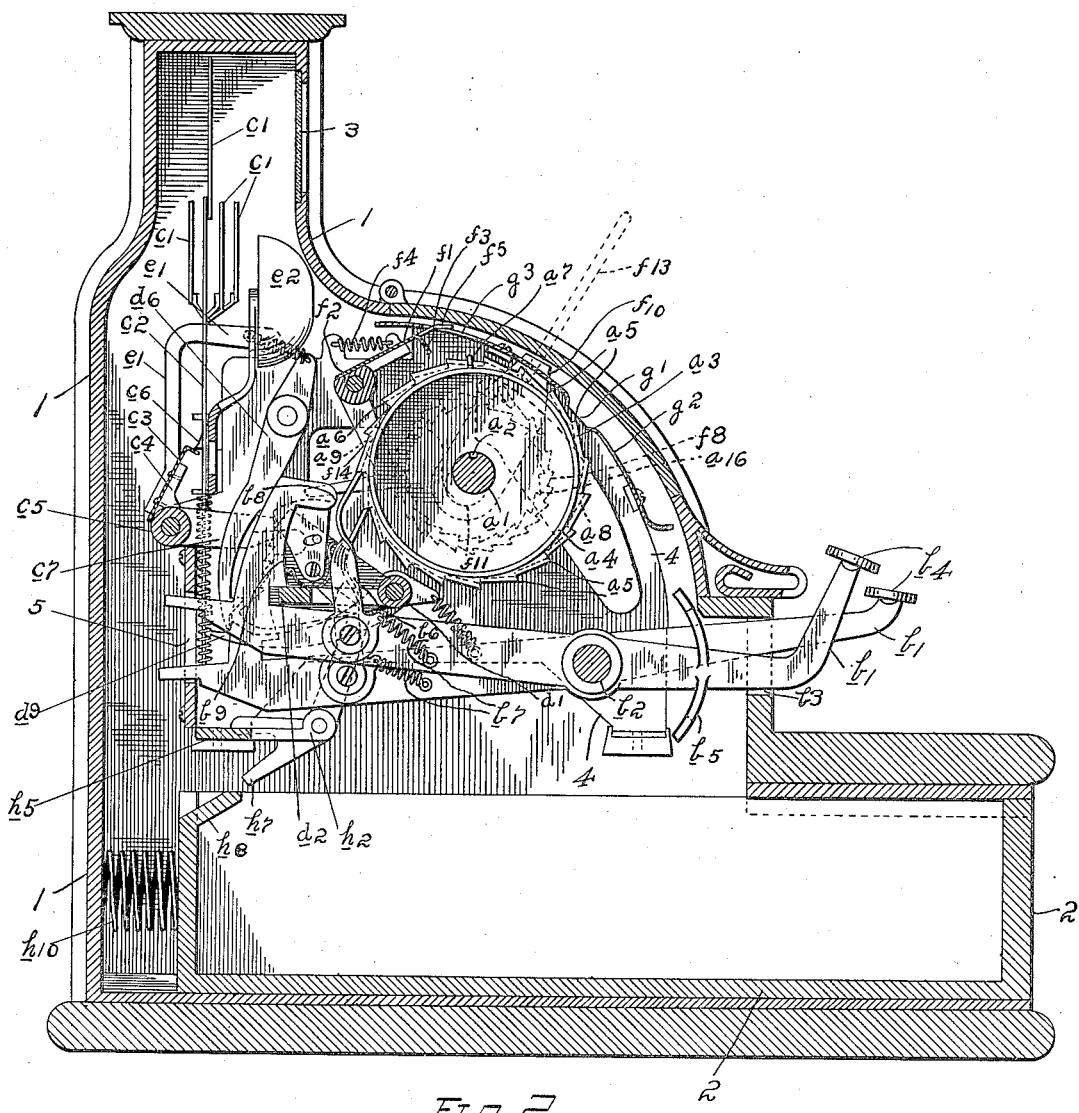

G. A. WINEMAN.
CASH REGISTER.
APPLICATION FILED APR. 17, 1908.
952,554.
Patented Mar. 22, 1910.
6 SHEETS—SHEET 1.
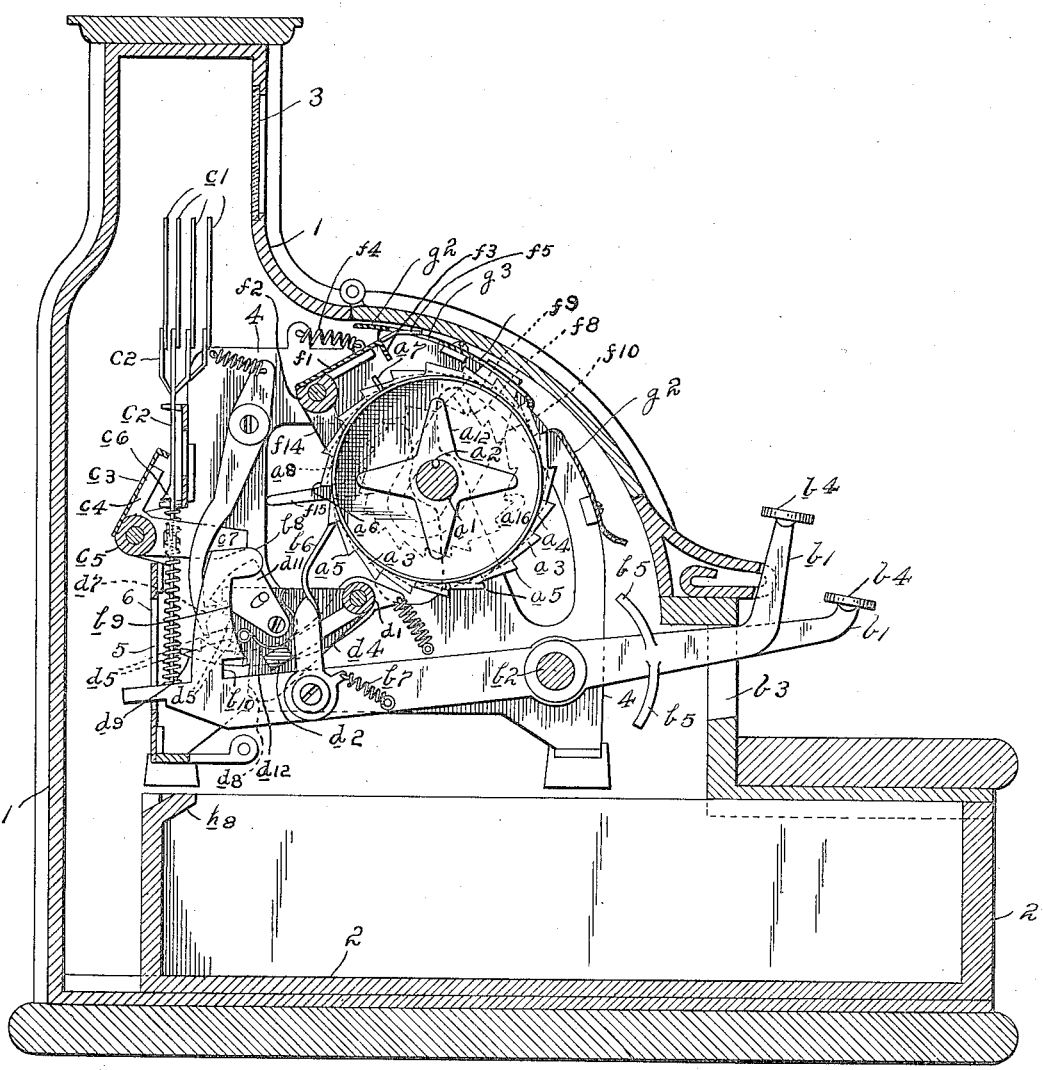
Fig. 1.
WITNESSES:
Walter A. Greenburg
Anna M. Dorr
INVENTOR
GUSTAVE A WINEMAN
BY 
ATTORNEYS G. A. WINEMAN.
CASH REGISTER.
APPLICATION FILED APR. 17, 1908.
952,554.
Patented Mar. 22, 1910.
6 SHEETS—SHEET 3.
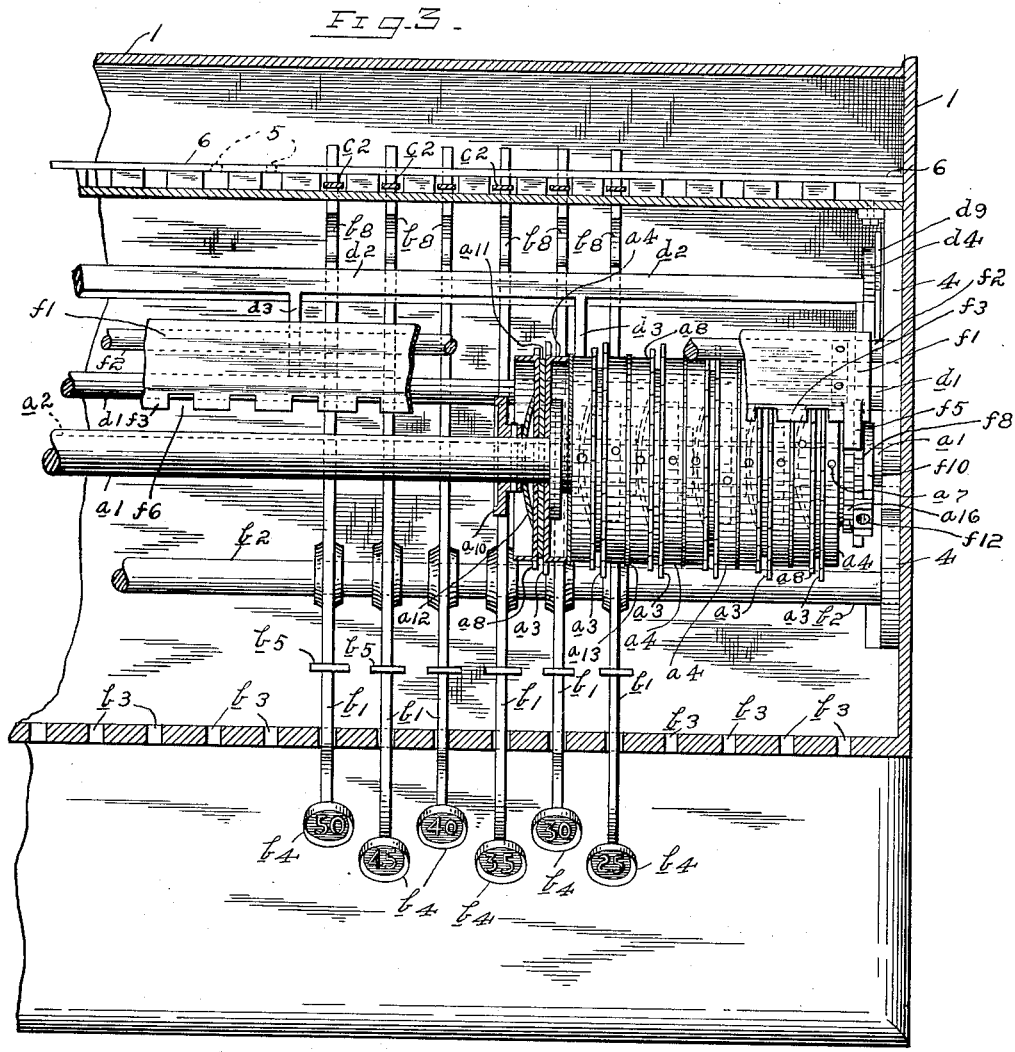
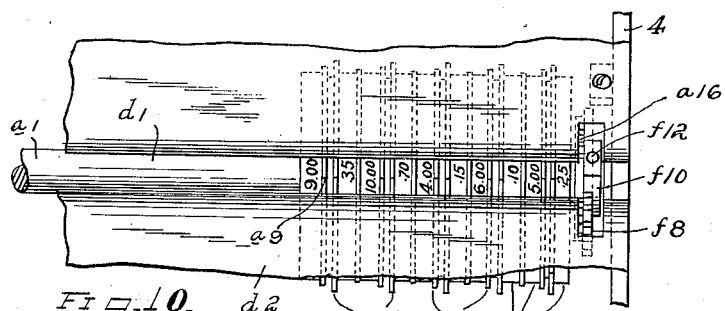
WITNESSES:
Walter A. Greenburg
Anna M. Dorr
INVENTOR
GUSTAVE A. WINEMAN
BY 
ATTORNEYS

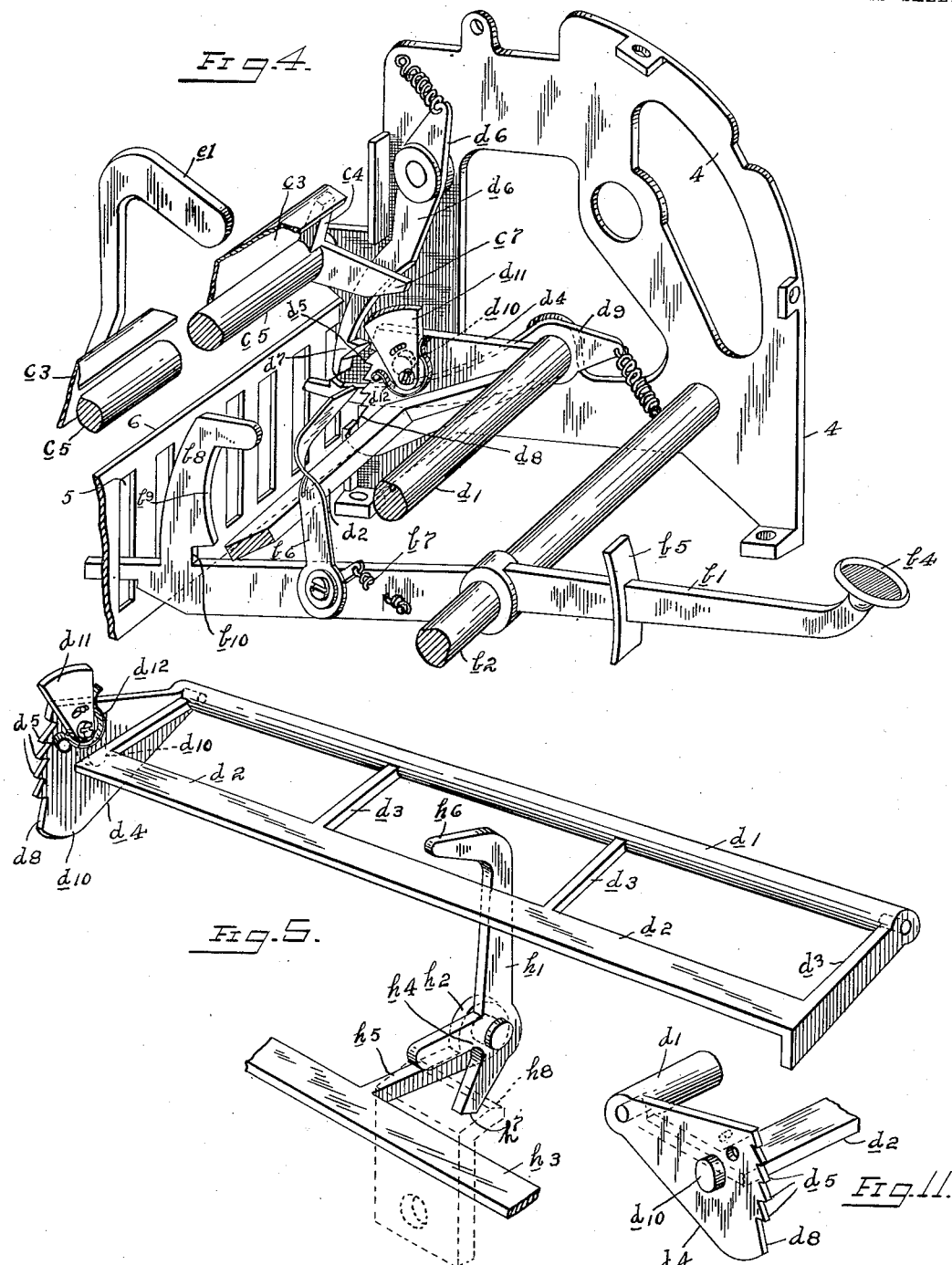

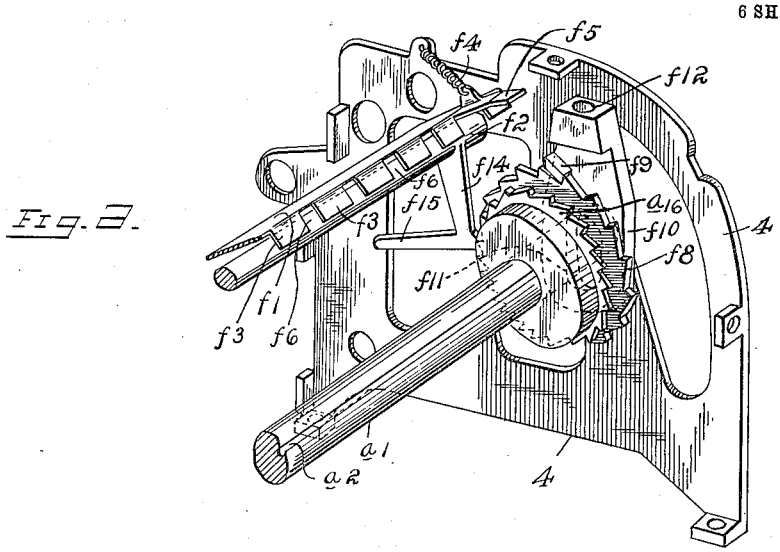
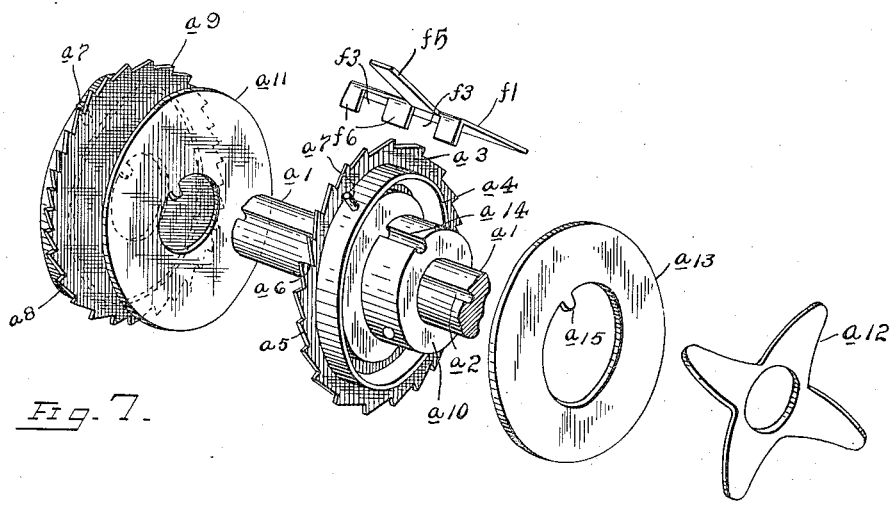

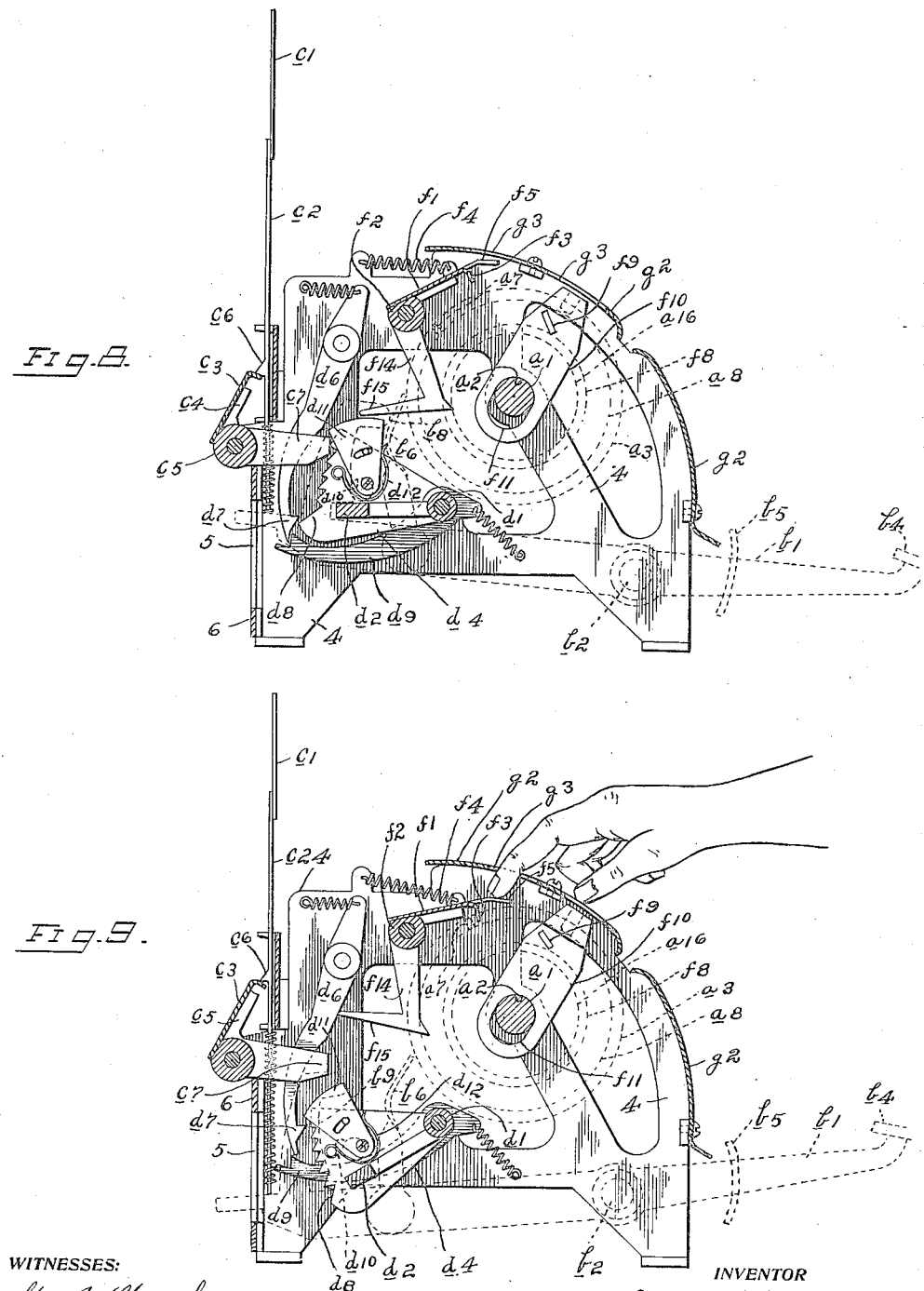

UNITED STATES PATENT OFFICE.

GUSTAVE A. WINEMAN, OF DETROIT, MICHIGAN.

CASH-REGISTER.

952,554.

Specification of Letters Patent.   Patented Mar. 22, 1910.

Application filed April 17, 1908.   Serial No. 427,573.

*To all whom it may concern:*

Be it known that I, GUSTAVE A. WINEMAN, a citizen of the United States of America, residing at Detroit, in the county of Wayne and State of Michigan, have invented certain new and useful Improvements in Cash-Registers, of which the following is a specification, reference being had therein to the accompanying drawings.
This invention relates to cash registers, and especially to an arrangement of the mechanism whereby a person operating the machine is prevented from inadvertently throwing the machine out of order by improper manipulation, or from intentionally tampering with it and falsifying the registration.

The invention consists in the matters hereinafter set forth, and more particularly pointed out in the appended claims.

In general terms, a register which incorporates features of the invention has a value registering mechanism; cash till locking and release means or till controlling mechanism, means for returning the registering device to initial position or resetting mechanism, together with interlocking members between these several groups which prevent improper operation of one of them to the injury of the others, and insure proper correlation of action between them.

In the drawings, Figure 1 is a view in transverse section of a cash register showing registering mechanism and resetting means in initial position, with till controlling mechanism omitted. Fig. 2 is a view in transverse section of the register showing the resetting mechanism, the registering mechanism with an operating key depressed, and till controlling mechanism in release position. Fig. 3 is a plan view, with parts of an exterior casing in section, and broken away, showing the general arrangement of the registering mechanism together with parts of the resetting means. Fig. 4 is a view in detail, enlarged and partially broken away, showing an operating key, universal key-coupler and key lock, and combined indicator arrest and alarm hammer. Fig. 5 is a view in detail of a till-lock in operative relation to the universal key-coupler. Fig. 6 is a view in detail, enlarged and partially broken away, of the resetting mechanism. Fig. 7 is a view in detail of a pair of registering wheels with spacing collars and star spring in position for assembling, with the position of a universal stop bar indicated. Fig. 8 is a view in detail of the coupler and key arrester at moment of release, together with a resetting yoke and safety latch. Fig. 9 is a view in detail of the resetting mechanism, with the safety latch holding the key arrester pawl clear. Fig. 10 is a view in detail showing the register wheels and the arrangement of the numerals thereon in reference to a view slot of an inner casing cover. Fig. 11 is a detail view of a coupler bar segment.

Referring to the drawings, 1 indicates an exterior casing of suitable design, having a spring-projected cash drawer or till 2 in its base, over which the operating mechanism is secured, a transparent view plate 3 being inserted in the upper front to give sight of indicating targets or tabs, and end frames 4 being provided for carrying the working parts.

The registering mechanism may be of any preferred type, but as herein illustrated has a main shaft $a^1$ journaled at each end in the frames 4, and provided with a key seat or groove $a^2$ extending throughout its length. A series of pairs of ratchet wheels are rotatably secured in regular spaced relation on the shaft. In a preferred form of construction the master wheel of each pair is a thin disk $a^3$ having a flange ring $a^4$ on one face thereof and regular ratchet teeth $a^5$ in its periphery, one of which is more deeply cut than the others to form a master tooth $a^6$. The flange ring $a^4$ has on its periphery a series of numerals corresponding to the teeth in number, and a radial stop $a^7$ which, for convenience in arrangement of coacting mechanism, is several spaces or teeth ahead of the master tooth $a^6$. The second or follower wheel $a^8$ is of like construction, but of less diameter, its ratchet teeth $a^9$ coming in register one by one with the master tooth $a^6$, so as to be engaged simultaneously therewith by any operating pawl. The wheels of each pair are set back to back against a stop or spacing collar $a^{10}$ secured to the shaft $a^1$, a washer $a^{11}$ being placed between the wheels with a star or spider spring $a^{12}$ rotatable on the shaft in compression between the outer wheel and the spacing collar $a^{10}$ of the adjacent pair. The outer margins of the adjacent flange rings $a^4$ of adjoining wheels are separated by circular division plates $a^{13}$, of slightly greater diameter than the rings, which are secured on the spacing-collars $a^{10}$, a longitudinal key-seat or groove $a^{14}$ in the collar being engaged by a lug or feather pin $a^{15}$ on the plate. A locking ratchet wheel $a^{16}$ with teeth opposed to the register wheel teeth is keyed or otherwise secured to the shaft $a^1$, with a detent or latch pawl $f^{14}$ engaging it and preventing the rotating of the register wheels from accidentally turning the shaft. A bank of operating lever keys $b^1$ are pivoted below the registering wheels on a rod $b^2$ parallel to the shaft $a^1$ secured to the end frames 4. The outer arms of the keys play in guide slots $b^3$ in the outer casing and finger button $b^4$ with numerals thereon are secured in the upturned extremities with segmental shields $b^5$ preferably integral with the levers just behind the guide slots. The inner arms of the keys oscillate in guide slots 5 in an upright plate 6 connecting the end plates. A pawl $b^6$ is pivoted on the inner arm of each key and is held by a suitably disposed spring $b^7$ in engagement with the master ratchet wheel $a^3$ of the pair of registering wheels in whose plane of rotation the key swings. The pawl may be conveniently stamped out of sheet metal as herein illustrated, and given a half twist to provide a bearing end sufficiently wide to engage both master and follower wheel teeth when engaging the master tooth $a^6$. A guard finger $b^8$ on the inner arm of the key is adapted to press the pawl $b^6$ when the key approaches the lower end of its stroke and to positively prevent the pawl from slipping off the wheel.

A row or bank of indicator targets or tabs $c^1$ are each carried on the upper end of a stem $c^2$ or rod stepped on the inner end of a lever key $b^1$ and longitudinally reciprocable between suitable guides in the casing or frame. A retaining plate $c^3$ is mounted on a pair of rock arms $c^4$ and pivot rod $c^5$ journaled in the frame so as to tilt against the stems $c^2$, a detent $c^6$ on each stem resting on the edge of the plate when the tab is pushed up and the lever released and preventing it from falling back until the retainer is swung back out of the path of the detent as by a member $d^{11}$ of the adjacent mechanism.

The numerals on the wheel flanges are disposed transversely as indicated and are so arranged that when the wheels are in initial position, the zeros all appear under a view slot $d^1$ of a plate $d^2$ acting as an inner cover over the wheels; thus by opening the outer casing at any time after the wheels are set, a column of figures is presented across the machine in such position that they may be readily added, thus giving the total registered sum without any trouble of transferring the items to paper.

The numerals on the lever finger plates give the value or amount registered by each key in the usual manner while each follower wheel of a pair is a totaler of the numerals on the master wheel ring, the series on the latter being multiples of the engaging lever button numeral as usual in this class of machines. A universal key coupler is also provided that locks together all keys which are displaced from their normal positions at substantially the same time and forces their uniform movement thereafter while it holds all other keys in their normal position until the interlocked keys have completed their full stroke and have been released, so that if two or more keys are started at the same time, they are engaged by the coupler, and if any of them is released by the operator, it is carried on down and the registration of its value effected by the depression of the key or keys with which it started. The coupler further acts as an arrester to prevent retrograde movement of any of the interlocked keys before completion of its stroke. The coupler is further adapted to act as a release or trip for the till lock, and therefore is a component of both the registering and till operating groups of mechanism.

In its preferred form, the coupler consists of a rod $d^1$ pivoted at each end in the frames 4 parallel to the key pivot $b^2$ in such position that its axis coincides with the center of curvature of the inner concave faces $b^9$ of the guard fingers $b^8$ of the keys, and a lock plate $d^2$ secured in parallel spaced relation to the rod by radius arms $d^3$, the latter being so disposed that the plate $d^2$ rides on the inner arms of the keys close to the bases of the guard fingers when the keys are not depressed. The radius of curvature of the finger faces $b^9$ is less than the radius of motion of the fingers themselves so that the raising of the inner arm of any of the keys causes the lock bar to slide into a slot $b^{10}$ in the base of the guard finger of such key, while it sweeps the curved faces $b^9$ of the guard fingers of the stationary keys, thus preventing their movement. One of the end radius arms of the coupler is in form a segmental plate $d^4$ which has ratchet teeth $d^5$ locked against downward movement by engagement with a spring-pressed or gravity pawl $d^6$ pivoted on the adjacent end frame 4, and provided with a detent $d^7$ of sufficient thickness to lie in the plane of oscillation of the segment. A cam face $d^8$ which is substantially an elongation of the inclined face of the lowest tooth of the segment is adapted to push the pawl out of the return path of the segment teeth $d^5$ as the coupler reaches the upper end of its stroke, and a spring pressed latch $d^9$ journaled on the pivot stud of the coupler pivot rod $d^1$ snaps in and holds it clear of the segment until a knock-off button $d^{10}$ strikes the latch down as the coupler bar falls to its original position so that the pawl returns to its starting point.

A wiper block $d^{11}$ is pivotally secured on the segment $d^4$ to underrun a rock arm $c^7$ of the retaining plate pivot rod $c^5$ and raise it as the coupler rocks up, thereby tilting the target retainer $c^3$ back and permitting any raised targets to drop. A spring member $d^{12}$ allows the wiper to snap back around the rock arm $c^7$ when the coupler drops. This movement is so timed that the standing targets are released and disappear from behind the view plate 3 before the ones carried up by the moving keys are in sight. This arrangement prevents the operator partially raising two targets, holding them in sight and pushing up one of the keys, thus showing a false register value to a customer. An alarm hammer $e^1$ carried by the target retainer $c^3$ strikes a bell $e^2$ when the retainer falls back as the wiper clears the rock arm. The coupler thus connects all keys simultaneously depressed and holds them so until the full stroke has been completed, release of the keys by the operator after they are once started down resulting in their arrest in the position assumed at the instant of release. The coupler at the same time holds all other keys in their normal position, while the operator may, by pressing down any one of the arrested keys, force all the other depressed keys with it to the end of the full stroke which is their release point, from which they fall back to the normal undepressed condition.

The resetting mechanism has a universal stop plate $f^1$ secured at its rear edge to a pivot bar $f^2$ so journaled in the end frames parallel to the register wheel shaft $a^1$ that a downturned front flange $f^3$ on the plate overhangs the bank of register wheels. A suitable spring $f^4$ holds it clear of the wheels normally but it may be pressed down by a finger lever $f^5$ underlying an aperture $g^3$ in the inner cover plate $g^2$ so that its flange $f^3$, which has notches $f^6$ adapted to bridge the register wheel division plates $a^{11}$, is in the paths of the stop pins $a^7$ on the wheel rings. A ratchet wheel $f^8$ oppositely disposed to the locking ratchet $a^{16}$ is engaged by a dog $f^9$ on a yoke $f^{10}$ oscillating on the shaft $a^1$, its elongated bearing slot $f^{11}$ permitting it to be returned over the ratchet teeth, and a handle socket $f^{12}$ being provided for a removable handle bar $f^{13}$. The latch pawl $f^{14}$ previously described in connection with the locking ratchet $a^{16}$, is a rock arm of the pivot bar $f^2$ and has a safety trip finger $f^{15}$ which strikes the segment pawl $d^6$ and moves it back when the stop plate is depressed. This releases the coupler together with all depressed or arrested keys and their pawls, so that they are not sprung or forced out of line when the machine is reset. When the stop plate is not depressed the pawl $f^{14}$ is locked with the wheel $a^{16}$, thereby preventing operation of the resetter. When the rocking of the resetting yoke has brought all the stop pins against the flange $f^1$, the zeros of the wheel rings are all alined under the view slot $g^1$ of the inner cover $g^2$.

The till controlling means is an oscillatory bell-crank lever $h^1$ pivoted on a horizontal arm $h^2$ of a cross-brace $h^3$ of the machine, with its forked horizontal lower arm $h^4$ vibrating astride a stop arm $h^5$, its upper inturned end $h^6$ extending over the inner edge of the lock bar $d^2$. The end $h^7$ of the lower fork arm intercepts the upper margin $h^8$ of the till when the lever is held against the lower coupler as by a spring (not shown), but when the coupler rises, the camming action of the lock bar on the inclined lower side of the arm $h^6$ tilts the lever back so that its fork end clears the till and allows a spring $h^{10}$ to push the drawer out. The parts are so turned that the till is unlocked only when the coupler is at the end of its upstroke, and therefore a partial depression of a key or keys does not cause it to open.

One feature of the machine is the guard finger on each key conveniently formed integrally therewith, that not only prevents over striking and jumping of the register wheel pawl, but also coöperates with the universal coupler to either move the key or hold it in normal position when the keys are struck. Another feature is the simple and efficient resetting mechanism together with its safety device which prevents it being operated when any of the keys are connected with the wheels and likewise holds the arrest and coupler out of gear so that the operator cannot throw a key partly down and leave it there, while manipulating the resetting yoke. The registering wheels are not loaded or engaged with the resetting mechanism at all save through the frictional engagement of the main shaft, while the resetter itself is noiseless in action except on the return of the yoke over the single ratchet wheel. Another point of advantage is the throwing up of the cumulated values of the several wheels in a column that can be added or totaled without transcribing the items, as usually has to be done in machines of this kind.

The division disks keyed or splined to the shaft between the register wheels so that they prevent dragging of one wheel by its rotating companion in case dirt or the like drops between them or their rings become sprung so as to run together, is another feature. Furthermore, the universal coupling and locking and arresting members replace the parts which ordinarily have to be repeated for each registering wheel and lever, greatly simplifying the machine, removing trouble of adjustment and lowering cost of production and maintenance.

Obviously changes in the construction may be made without departing from the spirit of the invention, and I do not limit myself to any particular form or arrangement of parts.

What I claim as my invention is:—

1. In a cash register, registering mechanism, a series of operating keys, each provided with a member adapted to actuate the registering mechanism, a guard member adapted to hold said registering member in positive engagement with the registering mechanism and a universal coupler extending across the keys and movable up and down therewith, adapted to lock with all keys displaced from their normal positions and simultaneously therewith to engage the guard members of all other keys and thereby hold said keys from displacement.

2. In a cash register, registering mechanism, a series of operating keys each provided with a member adapted to actuate the registering mechanism, a guard member adapted to hold said registering member in positive engagement with the registering mechanism and a universal coupler extending across the keys and movable up and down therewith, adapted to interlock all keys displaced from their normal positions and simultaneously therewith to engage the guard members of all other keys and to lock said keys in their normal position.

3. In a cash register, registering mechanism, a series of operating keys each provided with a member adapted to actuate the registering mechanism, a guard member adapted to hold said registering member in positive engagement with the registering mechanism and a single universal coupler bar extending across the keys in constant contact with all of them and movable up and down therewith, adapted to interlock all keys displaced from their normal positions to move in unison, and simultaneously therewith to engage the guard members of all other keys and to lock said keys in their normal position.

4. In a cash register, registering mechanism, a series of operating keys each provided with a member adapted to actuate the registering mechanism, a guard member adapted to hold said registering member in positive engagement with the registering mechanism and a universal coupler extending across them and moving up and down therewith, said coupler being constantly in contact throughout its range of movement with guard members of all keys in their normal position and in interlocking engagement with all keys displaced from their normal positions, said coupler being adapted to hold stationary all keys in their normal position when it is interlocked with any displaced keys.

5. In a cash register, registering mechanism, a series of operating keys each provided with a member adapted to actuate the registering mechanism, a guard member adapted to hold said registering member in positive engagement with the registering mechanism and a single universal coupler bar extending across them and moving up and down therewith, said coupler bar being constantly in contact throughout its range of movement with guard members of all keys in their normal position and in interlocking engagement with all keys displaced from their normal positions, and being adapted when so interlocked with a displaced key, to hold stationary all normally positioned keys.

6. In a cash register, registering mechanism, a series of operating keys each provided with a member adapted to actuate the registering mechanism, a guard member adapted to hold said registering member in positive engagement with the registering mechanism and a universal laterally tiltable coupler bar extending across them and movable up and down with them, one margin of the bar being constantly in contact throughout its range of movement with guard members of all keys in their normal position and in interlocking engagement with the guard members of all keys displaced from their normal position and being adapted when so interlocked with a displaced key to hold stationary all normally positioned keys.

7. In a cash register, a registering mechanism, and a series of operating keys therefor, each carrying a pawl yieldingly engaging a member of the registering mechanism and a rigid guard finger on each key adapted to hold the pawl in positive engagement with said member during a predetermined portion of the key stroke.

8. In a cash register, registering mechanism, a series of operating keys therefor, a pawl on each key adapted to yieldingly engage a member of the mechanism, a guard finger on each key adapted to hold the key pawl in positive engagement with said member, and a universal coupler member adapted to interlock the guard fingers of all keys displaced from their normal position to move in unison, and to simultaneously therewith engage the guard members of all other keys and thereby lock the latter against movement.

9. In a cash register, a series of register ratchet wheels, a series of operating keys therefor, a pawl pivoted on each key adapted to yieldingly engage one of the wheels, and a rigid guard finger on each key adapted to hold the pawl in positive engagement with the wheel during a predetermined portion of the key stroke.

10. In a cash register, a series of register ratchet wheels, a series of operating keys therefor, a pawl pivoted on each key adapted to yieldingly engage one of the wheels, and a rigid guard finger integrally formed on each key adapted to hold the pawl in positive engagement with the wheel during a predetermined portion of the key stroke.

11. In a cash register, a series of register ratchet wheels, a series of operating keys therefor, each provided with a pawl yieldingly engaging a wheel and with a rigid guard finger adapted to hold the pawl in positive engagement with the wheel during a predetermined portion of the key stroke, and a universal coupler extending across the keys and movable up and down therewith, adapted to interlock with all displaced keys and to lie in the path of motion of the guard fingers of all keys in their normal positions and in contact therewith when so interlocked.

12. In a cash register, a series of register ratchet wheels, a series of operating keys therefor, a pawl on each key yieldingly engaging a ratchet wheel, a rigid guard finger on each key adapted to hold the key pawl in positive engagement with the wheel during a predetermined portion of its stroke, and a universal coupler extending across the keys and movable up and down therewith, said coupler being adapted to interlock with any and all keys displaced from their normal positions, and when so interlocked to lie in the path of motion of the guard fingers of all normally positioned keys and lock them in their normal position.

13. In a cash register, a series of register ratchet wheels, a series of operating keys therefor, a pawl on each key yieldingly engaging a ratchet wheel, a rigid guard finger on each key adapted to hold the key pawl in positive engagement with the wheel during a predetermined portion of its stroke, and a universal coupler extending across the keys and movable up and down therewith, said coupler interlocking with all displaced keys and contacting when so interlocked with all the guard fingers of the normally positioned keys throughout its range of movement, the coupler being adapted to lock the keys of the fingers contacting with it against movement.

14. In a cash register, registering mechanism a series of operating keys therefor pivoted to oscillate in vertical planes on a common axis, and provided with guard fingers adapted to hold the keys positively in operative engagement with the registering mechanism having concave faces proximate the axis whose centers of curvatures lie in a line parallel to the axis when the keys are in normal position, and a universal coupler extending across the keys and swinging on an axis coincident with the center line and in contact with the concave faces of the guard fingers of all normally positioned keys throughout its range of motion, said coupler being adapted to interlock with the fingers of all keys displaced from normal position.

15. In a cash register having registering mechanism, a series of operating keys each provided with yieldingly vibratable members adapted to actuate the registering mechanism pivoted on a common shaft and provided with guard fingers having concave faces proximate the shaft whose centers of curvature are coincident with the axis of a pivot rod parallel to the shaft when the keys are in normal position, and a universal coupler bar extending across the keys and swinging on the pivot rod in contact with the finger faces of all normally positioned keys adapted to interlock with keys displaced from their normal position the guard fingers being adapted to hold the vibratable members positively in engagement with the registering mechanism during a portion of the stroke.

16. In a cash register, a pivot rod, a pivot shaft parallel thereto, a series of operating key levers fulcrumed on the shaft and provided with pawls for engaging other mechanism, guard fingers on the levers that are adapted to hold the pawls in engagement during a portion of the key stroke and having concave faces proximate the shaft whose centers of curvature are coincident with the rod axis when the levers are in normal position, and a universal coupler swinging on the rod across the levers, the coupler being adapted to interlock with all displaced keys and to move up and down therewith in contact with the finger faces of all the normally positioned keys.

17. In a cash register, registering mechanism, a series of operating keys therefor each provided with a yieldingly movable member adapted to engage the registering mechanism and a finger having concave face eccentric to the arc described by the fingers when the keys are oscillated and a coupler extending across the keys pivoted to swing concentrically with the finger faces of all normally positioned keys and in contact therewith throughout its range of movement, the coupler being adapted to interlock with all keys when they are displaced and to move up and down with them, the guard finger of each lever being adapted to hold the yielding member of said lever positively in engagement with the registering mechanism during the key stroke.

18. In a cash register, registering mechanism, a pivot shaft, a series of operating key levers fulcrumed thereon, a pivot rod parallel to the pivot shaft, a yieldingly movable member on each key adapted to actuate the registering mechanism, a finger on an arm of each key adapted to hold the yielding member positively in engagement with the mechanism during the key stroke having a concave face whose center of curvature when the key is in normal position is coincident with the pivot rod axis, and a base slot parallel to the key arm, and a universal coupler bar extending across the keys, secured in parallel relation to the pivot rod by radius arms and adapted to swing concentrically to and in contact with the finger faces of all key levers that are in normal position and to engage the base slots of and move up and down with all displaced key levers.

19. In a cash register, a series of register ratchet wheels, a series of operating keys therefor, a pawl pivoted on each key adapted to yieldingly engage one of the wheels, a rigid guard finger on each key adapted to hold the pawl in positive engagement with the wheel during a predetermined portion of the key stroke and provided with a concave face eccentric to the arc described by the finger when the key is oscillated and with a slot in said face parallel to the key, and a universal coupler pivoted to swing concentrically to and in contact with the finger faces of all normally positioned keys, and to engage the slots of and move with all keys displaced from their normal positions.

20. In a cash register, a main shaft, a series of register wheels thereon, a pivot shaft parallel to the main shaft, a series of lever keys fulcrumed on the pivot shaft, a pivot rod parallel to the shafts, a pawl on each lever adapted to yieldingly engage a ratchet wheel, a finger on each lever adapted to hold the lever pawl in positive engagement with the wheel during a predetermined portion of the lever stroke, the finger having a concave face whose center of curvature is coincident with the pivot rod axis and a slot in the face substantially parallel to the lever, and a universal coupler swinging on the pivot rod across the keys, adapted to interlock with the finger slots of all keys displaced from their normal position and move up and down with them, and to sweep the finger faces of all normally positioned keys throughout the range of its movement when so interlocked.

21. In a cash register, the combination with a series of registering wheels, operating lever keys therefor, means on the levers adapted to yieldingly engage the wheels, and guard fingers on the levers adapted to hold the engaging means in positive engagement with the wheel during a portion of the lever stroke, of a universal coupler adapted to interlock with the fingers of all displaced keys and move up and down therewith and when so interlocked to engage with the fingers of all other lever keys and lock said keys in their normal position, and arresting means on the coupler adapted to prevent retrograde movement of the coupler and interlocked, displaced keys until they have reached the limit of their initial movement forward.

22. In a cash register, a series of operating keys, a universal coupler extending across the keys and moving up and down with them, adapted to lock with all keys displaced from their normal positions and simultaneously therewith to engage and hold all other keys from displacement, and a segmental plate moving with the coupler and having ratchet teeth on its periphery, a pawl yieldingly engaging the plate teeth and preventing its retrograde movement when interlocked therewith, a cam tooth terminating the segment ratchets adapted to swing the pawl clear of the path of motion of the ratchets, a latch adapted to lock with the pawl when so moved clear of the ratchets and a knock off member on the segment adapted to trip the latch when the segment returns to its normal position.

23. In a cash register, the combination with a series of registering wheels, operating lever keys therefor, means on the levers adapted to yieldingly engage the wheels, and guard fingers on the levers adapted to hold the engaging means in positive engagement with the wheels during a portion of the lever stroke, of a universal coupler adapted to interlock with the fingers of all displaced keys and move up and down therewith and when so interlocked to engage with the fingers of all other lever keys and lock said keys in their normal positions, and arresting means consisting of a segmental plate moving with the coupler and having ratchet teeth in its periphery, a pawl yieldingly engaging the plate teeth and preventing its retrograde movement when interlocked therewith, a cam tooth terminating the segment ratchets adapted to swing the pawl clear of the path of motion of the ratchets, a latch adapted to lock with the pawl when so moved clear of the ratchets and a knock off member of the segment adapted to trip the latch when the segment returns to its normal position.

24. In a cash register, a series of operating keys, a universal coupler consisting of a bar extending across the keys and swinging in an axis parallel to the bar, adapted to lock with all keys displaced from their normal positions, and to engage all other keys when so interlocked and lock them in normal position, a segmental ratchet plate secured on one end of the coupler concentric with the axis of oscillation, a pawl adapted to yieldingly engage the ratchet and lock it against downward movement, a cam tooth on the plate adapted to move the pawl out of the path of motion of the ratchet teeth, a latch adapted to lock it in withdrawn position, and a knock-off lug on the plate adapted to trip the latch when the coupler and plate resume their initial position.

25. In a cash register having a series of operating keys, and a universal coupler therefor, arresting means for locking the coupler against retrograde movement until it has reached its limit of motion consisting of a segmental plate swinging on its center in unison with the coupler, ratchet teeth on the plate periphery, a pawl yieldingly engaging the teeth and coöperating therewith to prevent movement of the segment to its initial position, a cam on the plate adapted to move the pawl out of engagement with the teeth as the segment approaches its outer limit of motion, a latch adapted to hold the pawl in such disengaged position and a knock-off member on the plate adapted to trip the latch and release the pawl as the plate approaches its normal position.

26. In a cash register, a series of operating keys, a universal coupler bar operatively engaging the keys secured on the ends of radius arms that are pivoted to swing in planes parallel to the planes of oscillation of the keys, one of said arms having a segmental ratchet rack on its outer end, a pawl yieldingly engaging the ratchets adapted to prevent downward movement of the segment, a cam on the segment adapted to disengage the pawl from the ratchet as the segment approaches the upper limit of its movement, a latch adapted to retain the pawl in its disengaged position, and a knock-off lug on the segment adapted to trip the latch and release the pawl when the segment returns to its initial position.

In testimony whereof I affix my signature in presence of two witnesses.

GUSTAVE A. WINEMAN.

Witnesses:
C. R. STICKNEY,
OTTO F. BARTHEL.